Sept. 8, 1931.  V. M. DIRKES  1,822,856

ABRASIVE PAD

Filed June 11, 1928

Inventor
Vincent M. Dirkes

By Blackmore, Spencer & Flick
Attorneys

Patented Sept. 8, 1931

1,822,856

UNITED STATES PATENT OFFICE

VINCENT M. DIRKES, OF DETROIT, MICHIGAN, ASSIGNOR TO GENERAL MOTORS CORPORATION, OF DETROIT, MICHIGAN, A CORPORATION OF DELAWARE

ABRASIVE PAD

Application filed June 11, 1928. Serial No. 284,328.

In the manufacture of automobile bodies, large quantities of sand paper and emery paper are used to rub down the finishing coats of paint or lacquer to give the desired polish. The rubbing down is customarily done by hand, and it is impossible for the operator to make effective use of any except the central portion of the sheet so that the sheets must be discarded frequently. It has heretofore been proposed to provide the abrasive only on the central portions of the sheet, but the saving of the abrasive hardly justifies the necessary changes in the method of manufacture.

In large body plants, the cost of the abrasive paper is a large item, and in studying the matter with a view to reducing the cost, my attention was attracted to the large quantities of rubber scrap and of broken pieces of glass that accumulate about such plants, and it occurred to me that the rubber could be reworked into the form of pads, and loaded with ground glass or other abrasive to make a cheap and more durable substitute for the sand paper now used. In developing the idea it occurred to me that by arranging the abrasive-loaded rubber in layers, it would be possible for the worker to remove one layer when its abrasive qualities had become reduced and expose a fresh layer for use. This I preferably accomplish by interposing sheets of fabric, paper or the like between the layers of rubber.

In practice, I have found that an abrasive pad made according to my invention forms a very cheap and effective abrasive tool, and that its life is long compared with abrasive papers now used.

Figure 1:
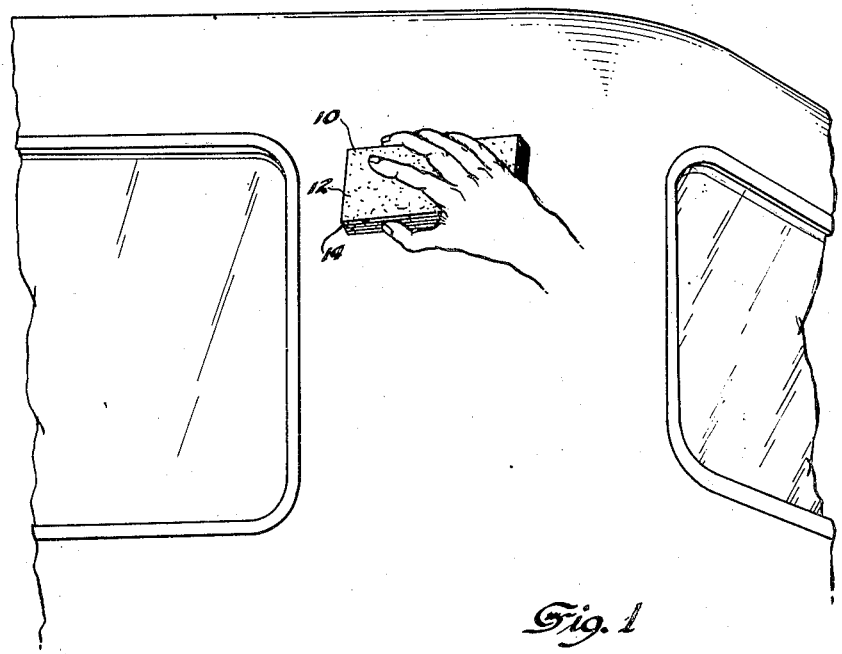
Figure 1 shows the use of my pad in polishing an automobile body.
Figure 2:
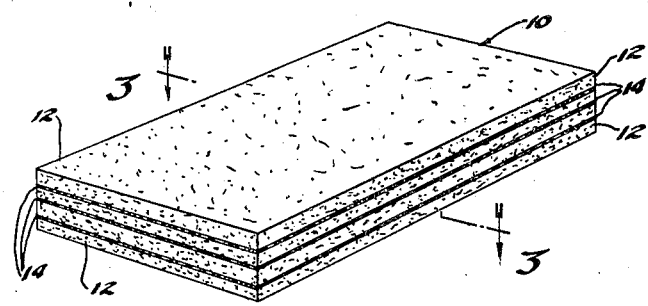
Figure 2 is a perspective view of the pad.
Figure 3:
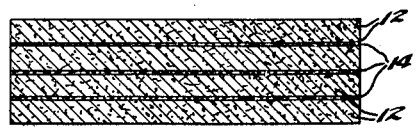
Figure 3 is an enlarged section through a portion of the pad.

I have indicated my improved pad at 10. In the form illustrated, this pad consists of alternate layers of rubber 12 and fabric or paper 14. The rubber is loaded with abrasive such as ground glass, sand or carborundum. The rubber used is preferably reworked rubber. For this purpose I may use the scrap rubber found about the body plants. When the layers of rubber and ground glass have been assembled, the whole may be vulcanized together under pressure, or secured together by the use of adhesive of any sort, such as rubber cement.

The laminated material thus produced may be cut up into blocks of any size or shape convenient for the hand of the operator. Obviously, when one layer becomes worn, it may be removed exposing a fresh layer for service. This may be continued until the whole block has been made use of.

I claim:

1. An abrasive pad consisting of layers of bonding material having abrasive embedded therein, each of said layers of bonding material being of sufficient thickness to provide a series of wearing surfaces in superposed relation, sheets of spacing material arranged between said layers, said layers and sheets being adhesively secured together to form a unitary pad, said layers being separable at the union between said sheets and layers to provide new friction surfaces when the upper surfaces become worn.

2. An abrasive pad consisting of layers of rubber impregnated with abrasive material, each of said layers being of sufficient thickness to provide a series of wearing surfaces in superposed relation, sheets of spacing material arranged between said layers, said layers and sheets being vulcanized together to form a unitary pad, said layers being separable at the union between said sheets and layers to provide new friction surfaces when the upper surfaces become worn.

In testimony whereof I affix my signature.

VINCENT M. DIRKES.